(12) United States Patent
Bowen et al.

(10) Patent No.: US 6,513,615 B2
(45) Date of Patent: Feb. 4, 2003

(54) FULL-TIME ALL-WHEEL DRIVE POWER TAKE-OFF UNIT FOR MOTOR VEHICLE

(75) Inventors: Thomas C. Bowen, Rochester Hills, MI (US); Fred C. Porter, Beverly Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/023,306

(22) Filed: Dec. 17, 2001

(65) Prior Publication Data

US 2002/0134605 A1 Sep. 26, 2002

Related U.S. Application Data

(60) Provisional application No. 60/278,901, filed on Mar. 26, 2001.

(51) Int. Cl.[7] .............................................. B60K 17/348
(52) U.S. Cl. ....................... 180/248; 475/221; 475/225; 475/252
(58) Field of Search ................................. 180/233, 248, 180/249, 250, 245, 246; 475/221, 222, 225, 248, 249, 252

(56) References Cited

U.S. PATENT DOCUMENTS

| | | | | |
|---|---|---|---|---|
| 3,768,336 A | * | 10/1973 | Wharton | .................. 74/714 |
| 4,031,780 A | | 6/1977 | Dolan et al. | |
| 4,041,804 A | * | 8/1977 | Clark | ........................ 74/711 |
| 4,457,394 A | * | 7/1984 | Suzuki | ..................... 180/247 |
| 4,589,304 A | * | 5/1986 | Ashikawa et al. | ........... 180/250 |
| 4,840,247 A | | 6/1989 | Kashihara et al. | |
| 4,866,624 A | | 9/1989 | Nishikawa et al. | |
| 4,873,892 A | * | 10/1989 | Ohkubo | ..................... 180/249 |
| 4,895,236 A | | 1/1990 | Sakakibara et al. | |
| 4,950,214 A | | 8/1990 | Botterill | |
| 4,969,532 A | * | 11/1990 | Oyama et al. | ............... 180/233 |
| 5,086,867 A | | 2/1992 | Hirota et al. | |
| 5,366,419 A | | 11/1994 | Oda | |
| 5,411,447 A | | 5/1995 | Frost | |
| 5,415,598 A | * | 5/1995 | Sawase et al. | ............... 475/248 |
| 5,904,632 A | | 5/1999 | Brown | |
| 5,910,064 A | | 6/1999 | Kuroki | |
| 6,076,623 A | * | 6/2000 | Teraoka et al. | .............. 180/233 |
| 6,142,905 A | | 11/2000 | Brown | |
| 6,158,303 A | | 12/2000 | Khiraishi et al. | |

* cited by examiner

*Primary Examiner*—Anne Marie Boehler
(74) *Attorney, Agent, or Firm*—Harness, Dickey & Pierce P.L.C.

(57) ABSTRACT

A full-time all-wheel drive system for a motor vehicle equipped with a transversely mounted engine and transaxle includes a power take-off unit. The power take-off unit includes an interaxle differential which drives a first power path connected to the front wheels and a second power path connected to the rear wheels. The first power path includes a planetary final drive unit which drives a double planetary front differential unit that is interconnected to a pair of front axleshafts. The second power path includes a helical gearset and a bevel gearset which deliver power to a rear propshaft.

21 Claims, 8 Drawing Sheets

FULL-TIME ALL-WHEEL DRIVE POWER TAKE-OFF UNIT FOR MOTOR VEHICLE

CROSS-REFERENCE TO RELATED APPLICATIONS

This application claims the benefit of U.S. Provisional Application No. 60/278,901, filed Mar. 26, 2001.

FIELD OF THE INVENTION

The present invention relates generally to all-wheel drive motor vehicles, and more particularly, to a power take-off unit providing full-time four-wheel drive to the front and rear drivelines.

BACKGROUND OF THE INVENTION

In recent years, there has been a significant increase in the demand for motor vehicles equipped with a powertrain capable of providing drive torque to all four wheels. Traditional four-wheel drive vehicles are equipped with a longitudinally-extending engine and transmission that deliver power to the input of a transfer case which, in turn, distributes the power to the front and rear drivelines. As is known, some transfer cases are equipped with a transfer clutch for automatically transferring power to the front driveline during lost traction situations to establish an "on-demand" four-wheel drive mode. Other transfer cases are equipped with an interaxle differential which functions to transmit power to both drivelines during normal conditions at a predetermined torque distribution ratio so as to establish a full-time four-wheel drive mode. Such four-wheel drive vehicles are typically based on a rear wheel drive arrangement and, as such, are generally limited to SUV's and trucks.

To provide drive torque to the rear wheels in front wheel drive vehicles, a power take-off unit (PTU) is driven by the output of a front-wheel drive transaxle and supplies power to the rear driveline. Typically, such an all-wheel drive arrangement delivers torque automatically (i.e., on-demand) through a transfer clutch to the rear driveline upon lost traction at the front wheels. Recently, a great deal of development effort has been directed at packaging the PTU and the remaining rear driveline components within the underbody of conventional front-wheel drive vehicles. Thus, a need exists to develop new AWD powertrain arrangements which are compact in size, can be packaged into existing front-wheel drive vehicles, and provide features (i.e., full-time AWD, automatic torque biasing) that enhance performance.

SUMMARY OF THE INVENTION

It is therefore an object of the present invention to provide an all-wheel drive system for a motor vehicle equipped with a transversely mounted engine and transmission assembly.

As a related object, the all-wheel drive system includes a power take-off unit having an interaxle differential which drives a first power path connected to the front wheels and a second power path connected to the rear wheels. The first power path includes a planetary final drive unit which drives a double planetary front differential unit that is interconnected to a pair of front axleshafts. The second power path includes a helical gearset and a bevel gearset which deliver power to a rear propshaft.

As further object, the PTU of the present invention may include an electronically-controlled biasing clutch assembly operable to control interaxle speed differentiation and torque-biasing.

These and other objects, advantages and features of the present invention will be apparent from studying the following detailed description and the drawings which, while disclosing the invention in the best mode currently known for carrying out the invention, are not intended to be limiting but rather exemplary of one application currently contemplated.

DETAILED DESCRIPTION OF THE PREFERRED EMBODIMENTS

The present invention is directed to a power take-off unit for use in an all-wheel drive vehicle equipped with a transversely mounted engine and transmission and which is arranged to provide a full-time four-wheel drive mode of operation. The right-angled design provides a compact package which permits use of the power take-off unit in a wide variety of all-wheel drive vehicles.

Figure 1:
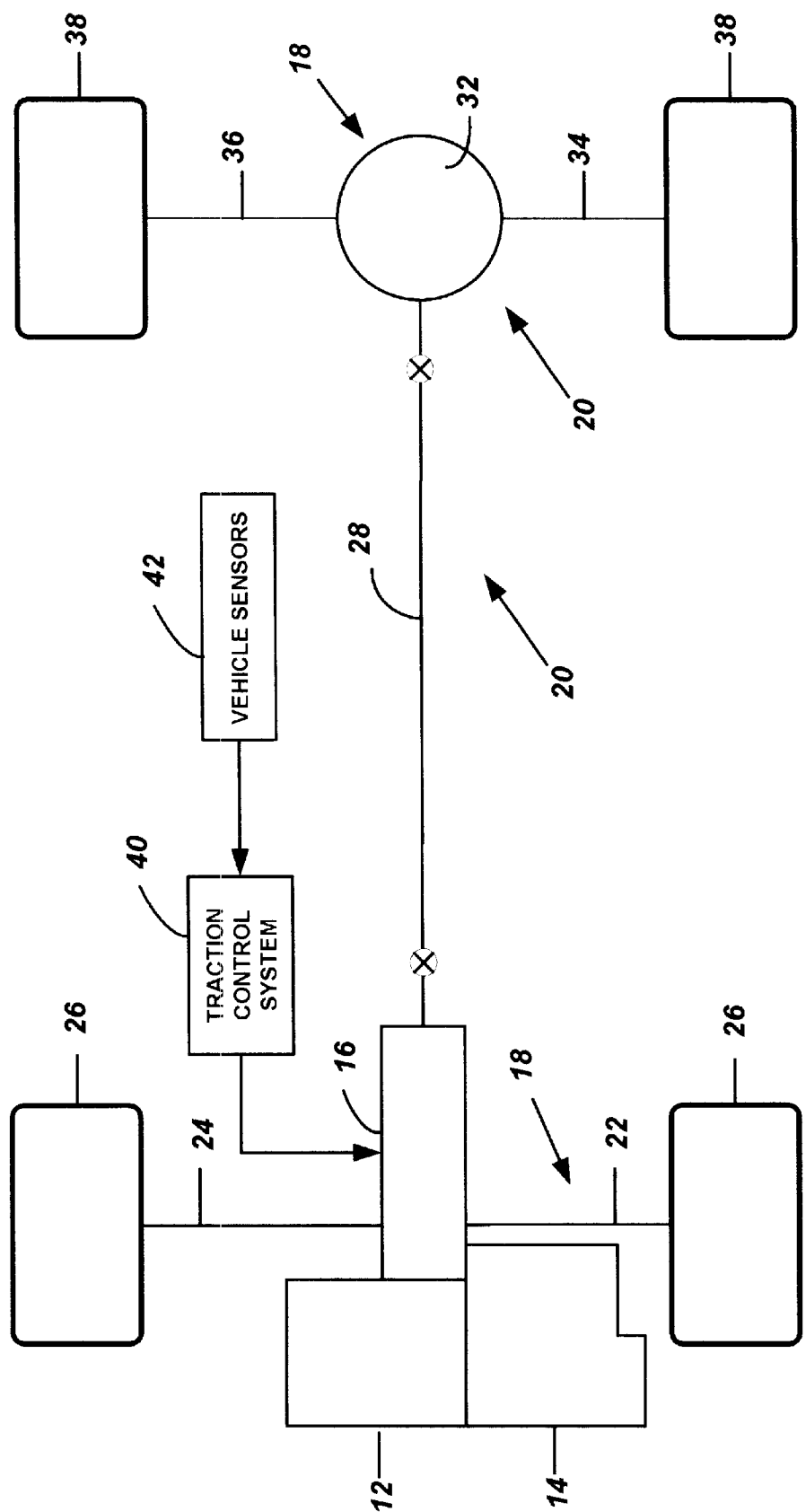
FIG. 1 is a schematic view of an all-wheel drive vehicle equipped with the full-time power take-off unit of the present invention.

Referring to FIG. 1, a schematic illustration of an all-wheel drive motor vehicle 10 is shown to include a transversely mounted engine 12 and transmission 14 adapted to deliver motive power (i.e., drive torque) to the input of a power take-off unit (PTU) 16. PTU 16 is adapted for use in a full-time all-wheel drive system and is operable to transfer drive torque at a predetermined distribution ratio to a front driveline 18 and a rear driveline 20. Front driveline 18 includes a pair of axleshafts 22 and 24 connected to a pair of ground-engaging wheels 26. Rear driveline 20 includes a drive shaft 28 and a rear axle assembly 30. One end of driveshaft 28 is connected to an output member of PTU 16 and its opposite end is connected to a differential 32 associated with rear axle assembly 30. Axle assembly 30 further includes a pair of axleshafts 34 and 36 which connect a pair of ground-engaging wheels 38 to differential 32. PTU 16 can be equipped with a torque biasing and slip limiting clutch assembly that is controlled by a traction control system 40 based on vehicle operating conditions, as detected by various vehicle sensors 42.

Referring primarily to FIGS. 2 through 7, the structure and function of the components associated with PTU 16 will now be described. In general, PTU 16 includes an input shaft 44, an interaxle differential 46, a front drive assembly 48, a rear drive assembly 50, and a torque biasing clutch assembly 52. Interaxle differential 46 is a compound planetary gearset having a planet carrier 54 fixed via a spline connection 56 to input shaft 44, a first sun gear 58, a set of first planet gears 60 rotatably supported by planet carrier 54 and meshed with first sun gear 58, a second sun gear 62, and a set of second planet gears 64 rotatably supported by planet carrier 54 and meshed with second sun gear 62. Each of first planet gears 60 is journalled on a pinion shaft 66 extending between a front carrier ring 68 and a rear carrier ring 70. Similarly, each of second planet gears 64 is journalled on a pinion shaft 72 extending between carrier rings 68 and 70. Meshed pairs of first planet gears 60 and second planet gears 64 are circumferentially arranged and equally-spaced on planet carrier 54 so as to establish a predetermined front/rear torque split and permit speed differentiation between first sun gear 58 and second sun gear 62. Preferably, about 60% of the torque transferred through interaxle differential 46 is delivered to front drive assembly 48 via first sun gear 58 while the remaining 40% of he drive torque is delivered to rear drive assembly 50 via second sun gear 62. Those skilled in the art will understand that this 60/40 torque distribution ratio can be modified to meet the requirements of each particular vehicular application.

As noted, drive torque is delivered to front drive assembly 48 from first sun gear 58. Front drive assembly 48 includes a final drive unit 74 and a differential unit 76. Final drive unit 74 is a simple planetary gearset having a sun gear 78, a ring gear 80, and a set of pinion gear 82 meshed with sun gear 78 and ring gear 80. Ring gear 80 is non-rotatably secured to housing 84 while each pinion gear 82 is rotatably supported by a bearing assembly 86 on a post 88 extending between front and rear carrier plates 90 and 92, respectively, of a pinion carrier 94. Sun gear 78 is shown to be integrally formed on one end of a tubular transfer shaft 96, the opposite end of which is fixed via a spline connection 98 to first sun gear 58 of interaxle differential 46. Transfer shaft 96 is shown to be supported on a front axleshaft 22 for rotation relative thereto. Thus, driven rotation of transfer shaft 96 causes pinion carrier 94 to be driven at a reduced speed ratio. In the particular arrangement shown, sun gear 78 has 42 teeth, ring gear 80 has 114 teeth, and pinion gears 82 have 36 teeth for establishing a reduction ration of 3.714 to 1.0. As will be appreciated, the reduction ratio can be modified to provide the desired speed reduction for the final drive unit 74.

Differential unit 76 is a dual planetary gearset driven by pinion carrier 94 and having a pair of outputs which are interconnected to axleshafts 22 and 24. Specifically, differential unit 76 includes an input ring gear 98 fixed for rotation with pinion carrier 94, an output sun gear 100 fixed via a spline connection 102 to axleshaft 22 and, an output carrier 104 fixed via a spline connection 106 to axleshaft 24. Differential unit 76 further includes, a set of first pinions 108 meshed with input ring gear 98, and a set of second pinions 110 meshed with output sun gear 100. First pinions 108 are journalled on pinion shafts 112 while second pinions 110 are journalled on pinion shafts 114. First pinions 108 and second pinions 110 are arranged in meshed pairs. Thus, differential unit 76 establishes a determined torque distribution ratio between front axleshafts 22 and 24. In this particular arrangement, ring gear 98 has 72 teeth, sun gear 100 has 36 teeth, first pinions 108 have 16 teeth and second pinions 110 have 16 teeth so as to establish a 50/50 front left-to-right torque split and permit speed differentiation between axleshafts 22 and 24.

Figure 2:
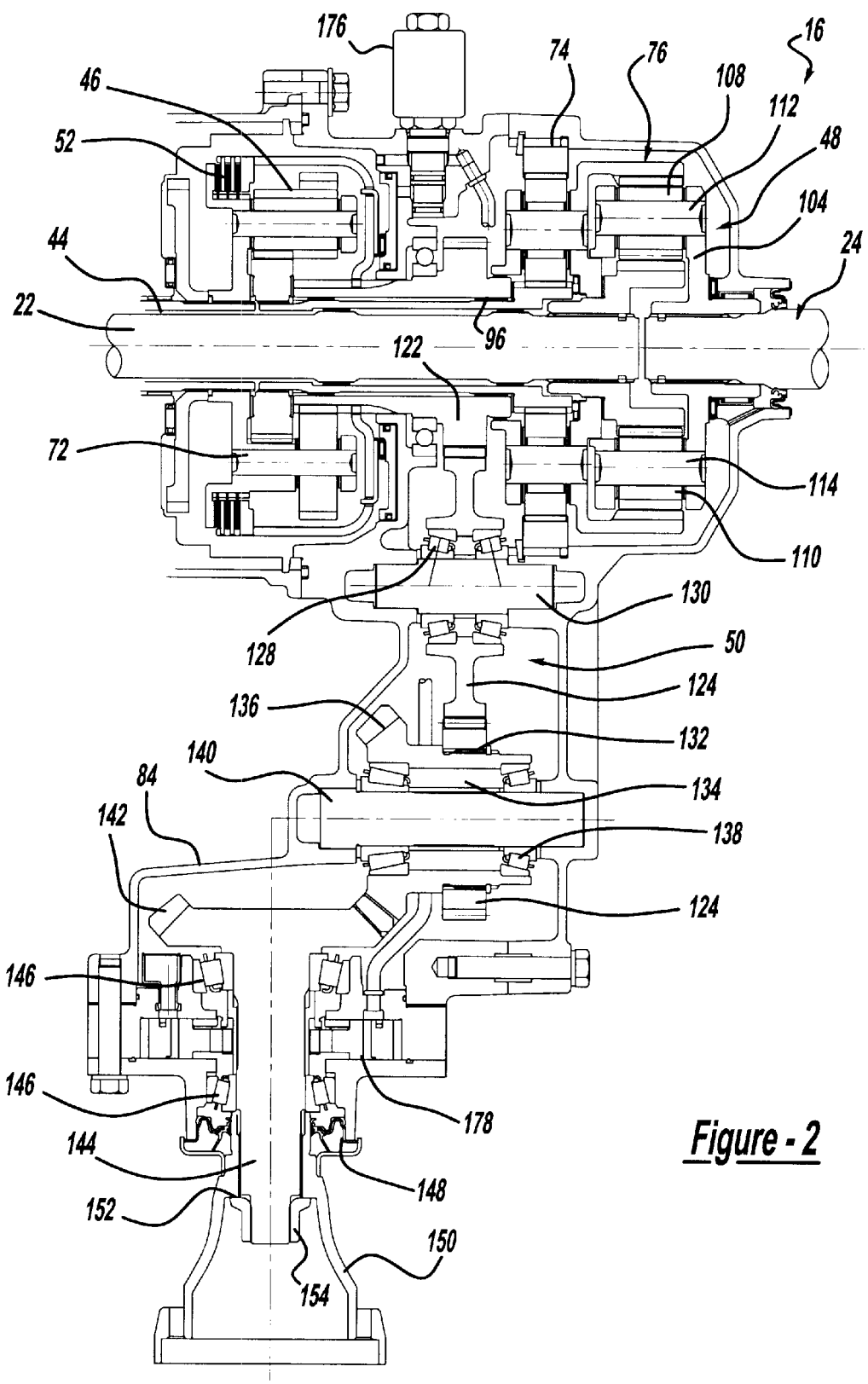
FIG. 2 is a sectional view of the full-time power take-off unit of the present invention.
Figure 3:
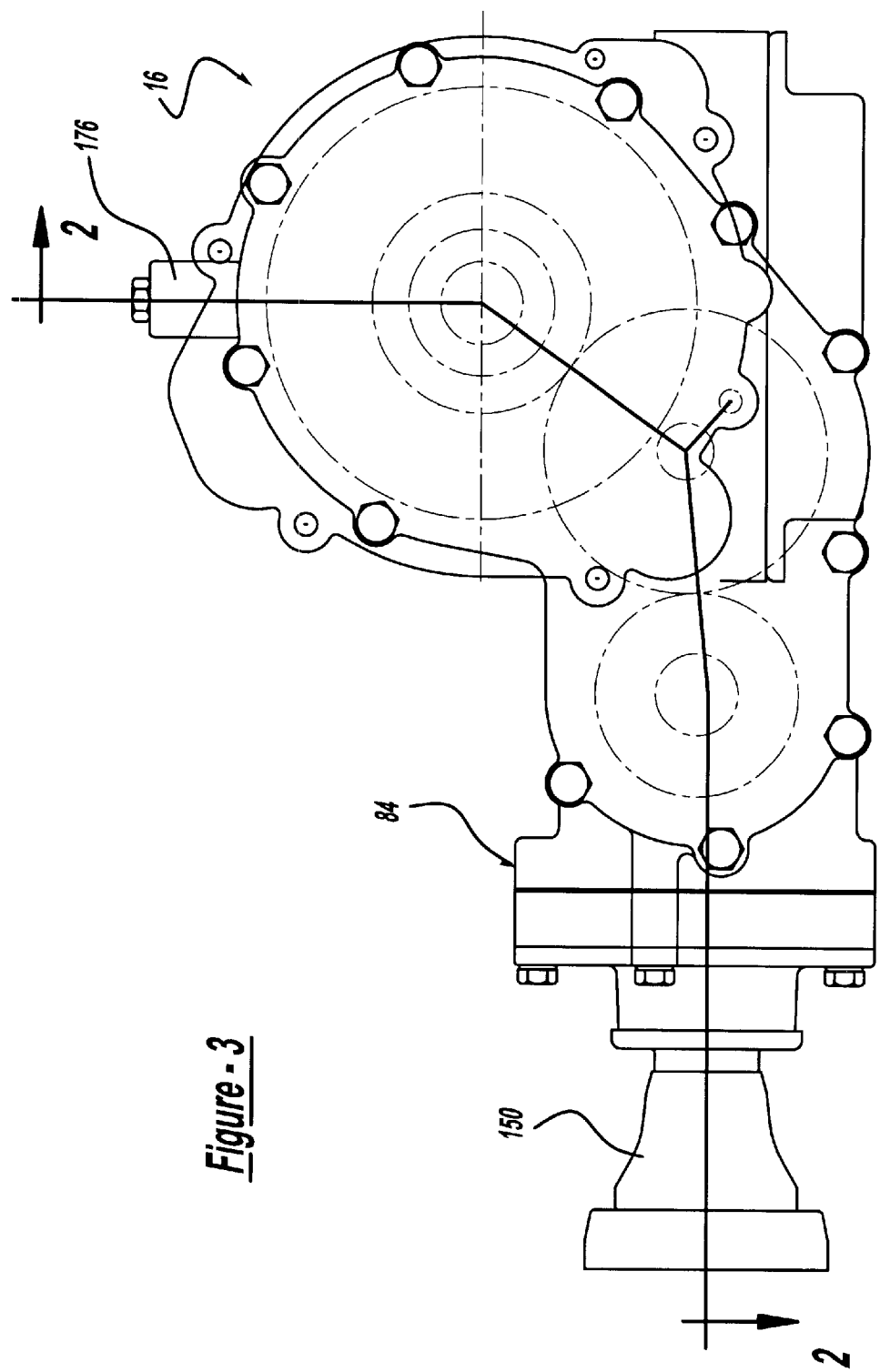
FIG. 3 is an end view of the power take-off unit showing section line A—A along which the sectional view of FIG. 2 was taken.
Figure 4:
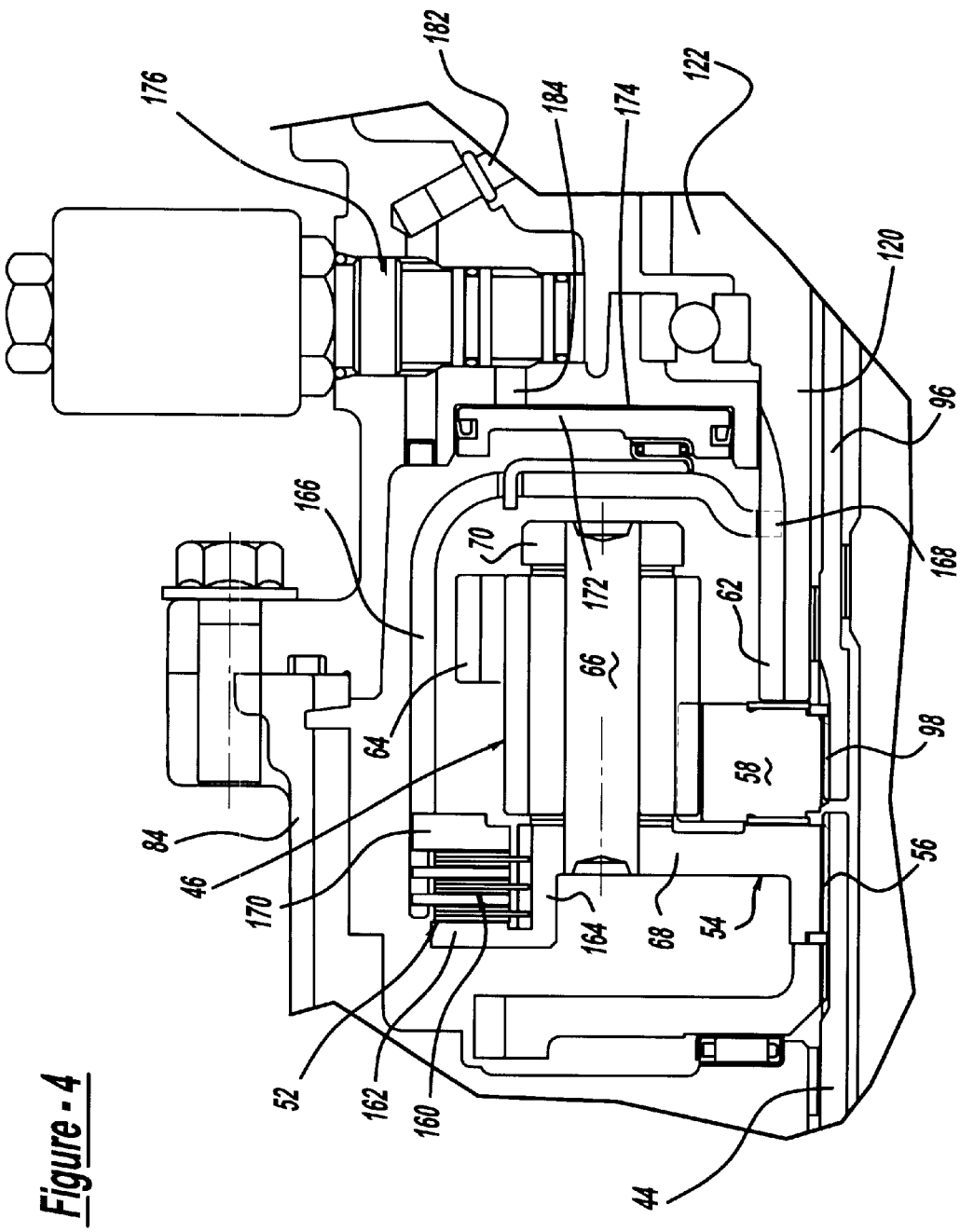
FIG. 4 is an enlarged partial view taken from FIG. 2 showing the components associated with the interaxle differential and biasing clutch in greater detail.
Figure 5:
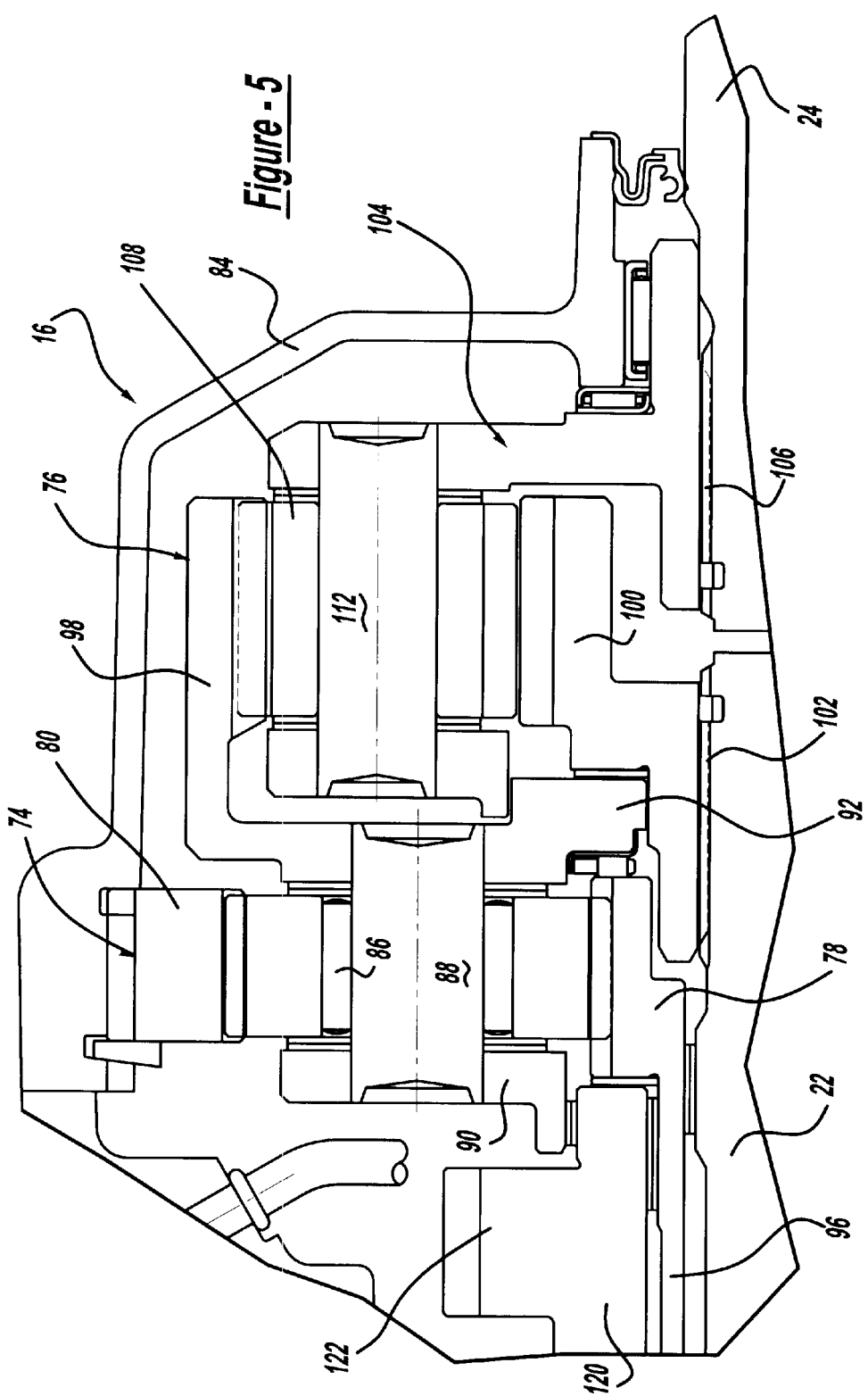
FIG. 5 is an enlarged partial view taken from FIG. 2 showing the components of the front final drive unit and front differential.
Figure 6:
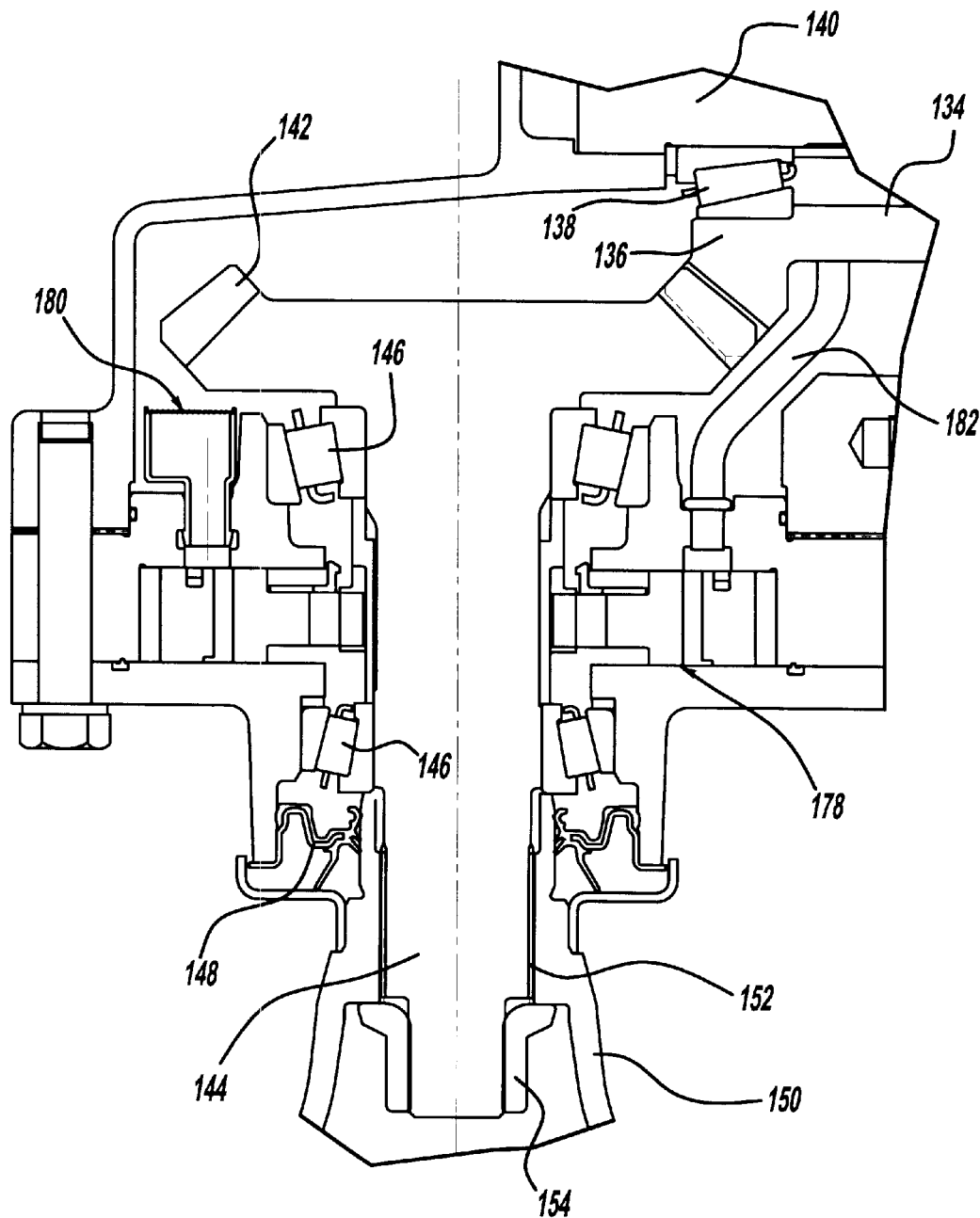
FIG. 6 is an enlarged partial view taken from FIG. 2 showing components associated with the bevel gearset and hydraulic fluid control system.
Figure 7:
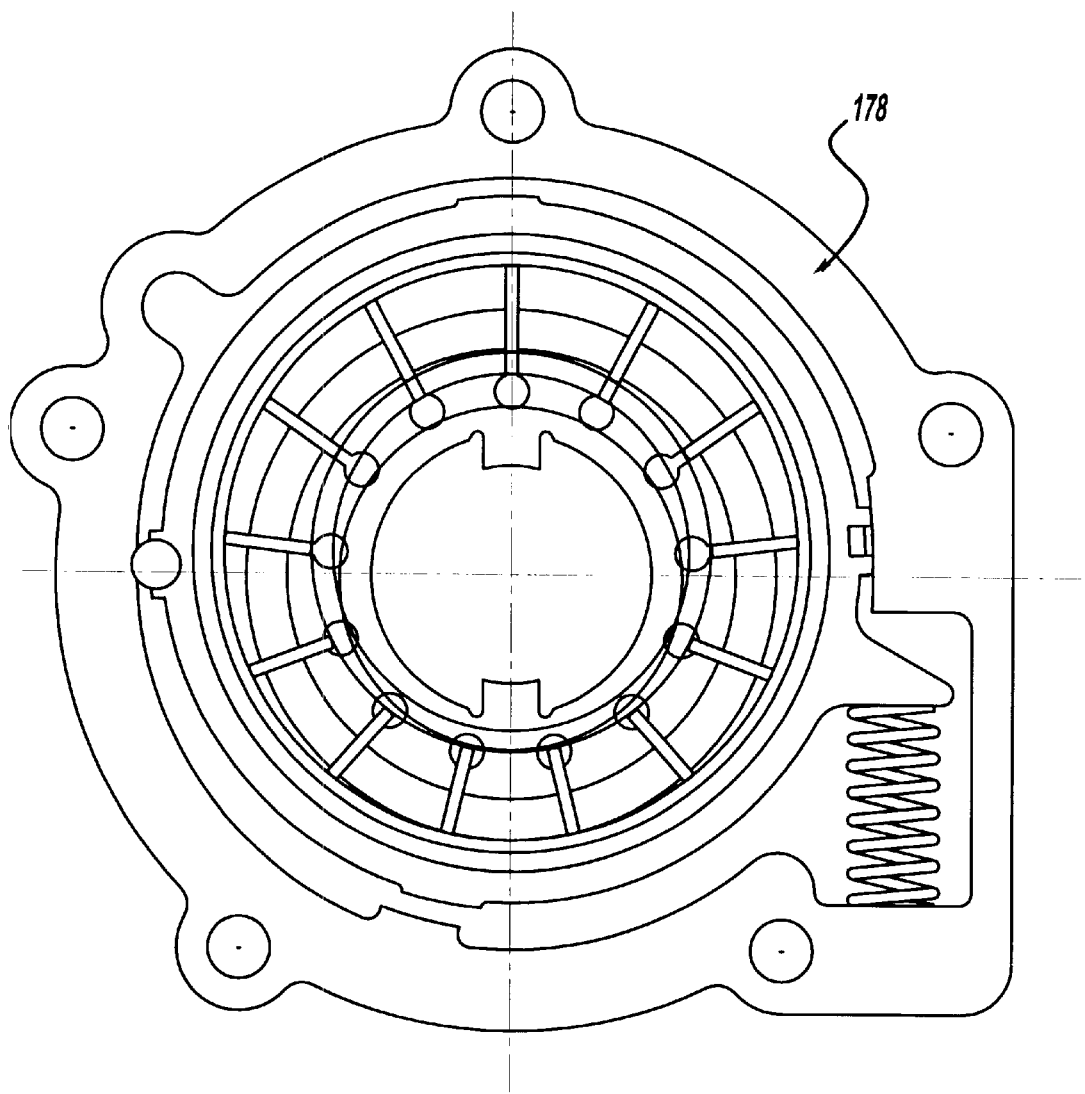
FIG. 7 shows the vane-type variable displacement pump installed in the power take-off unit.

Referring now primarily to FIGS. 2 and 6, rear drive assembly 50 is shown to include a second transfer shaft 120 that is rotatably supported on first transfer shaft 96. Second sun gear 62 is formed at one end of second transfer shaft 120 while a first transfer gear 122 is formed at its opposite end. First transfer gear 122 is part of a three gear helical gearset further including a second transfer gear 124 and a third transfer gear 126 that is meshed with both first transfer gear 122 and second transfer gear 124. Third transfer gear 126 is shown to be rotatably supported by bearing assemblies 128 on an idler shaft 130. Second transfer gear 126 is fixed via a spline connection 132 to a tubular hub segment 134 of a first bevel gear 136. Hub segment 134 of first bevel gear 136 is rotatably supported by a pair of laterally-spaced bearing assemblies 138 on a rail 140 that is secured to housing 84.

First bevel gear 136 is part of a two component bevel gearset also including a second bevel gear 142 that is meshed with first bevel gear 136 and is formed at one end of an output shaft 144. Output shaft 144 is supported for rotation relative to housing 84 by a pair of laterally-spaced bearing assemblies 146 and is sealed relative thereto via a resilient lipseal assembly 148. A yoke 150 is fixed via a spline connection 152 to the opposite end of output shaft 144 and is retained thereon within a lock nut 154.

Clutch assembly 52 is a hydraulically-actuated multi-plate clutch including a clutch pack 160 operably disposed between planet carrier 54 and second sun gear 62 of interaxle differential 46. In particular, clutch pack 160 also includes a set of inner clutch plates that are splined to a hub segment 164 of front carrier ring 68. Clutch pack 160 also includes a set of outer clutch plates that are splined to a clutch drum 166 fixed via a spline connection 168 to second transfer shaft 120. Clutch pack 160 is located between a reaction ring 162 formed on front carrier ring 68 and an apply plate 170. Apply plate 170 is also fixed for rotation with clutch drum 166 and is axially moveable relative to clutch pack 160 for exerting a compressive clutch engagement force so as to limit speed differentiation between planet carrier 54 and second transfer shaft 120.

Traction control system 40 is operable to control adaptive actuation of clutch assembly 52 and is shown to include an electro-hydraulic clutch actuation system. The clutch actuation system includes a piston 172 mounted in a piston chamber 174 formed in housing 84, a control valve 176 operable to control fluid flow into and out of piston chamber 174, and a pump 178 operable to supply high pressure fluid to an inlet of control valve 176. Fluid entrained in an internal sump located within housing 84 is drawn through a pump screen 180 into an inlet of pump 178. Pump 178 is shown as a variable displacement vane pump that is operable to generate a fluid pumping action in response to rotation of output shaft 144. High pressure fluid is discharged from pump 178 and is supplied via a supply line 182 to the inlet of control valve 176. Control valve 176 is an electro-hydraulic valve, such as a variable force solenoid valve, and has a control pressure outlet in fluid communication with piston chamber 174 via a flow passage 184 and an exhaust pressure outlet in fluid communication with the sump via an exhaust passage (not shown).

Based on a predetermined control strategy, the fluid pressure in piston chamber 174 is controlled to regulate axial movement of piston 172 which, in turn, axially moves clutch drum 166. Such axial movement of clutch drum 166 results in corresponding axial movement of apply plate 176. In this manner, the torque bias and speed differentiation across interaxle differential 46 can be variably controlled by adaptively regulating the clutch engagement force exerted by piston 172 on clutch pack 160. Preferably, traction control system 40 includes an electric controller adapted to receive input signals from the vehicle sensors 42 and regulate control of control valve 176 in response thereto. One example of a possible control strategies to be employed by control system 40 is shown and described in commonly-owned U.S. Pat. No. 6,071,207. In particular, the '207 patent discloses the strategy for actively controlling interaxle slip based on vehicle speed and the front-rear speed differential. Thus, it will be understood that hydraulic clutch actuation system disclosed could easily be replaced by a mechanically-actuated arrangement (see U.S. Pat. No. 5,400,866), an electromagnetic system, or any other clutch actuation system currently used or known in the power transmission art. As a further option, the electronically-controlled clutch system could be replaced with a passive system (i.e., viscous coupling, hydraulic coupling, geared traction couplings, etc.) which only is activated in response to excessive speed differentiation across interaxle differential 46.

Figure 8:
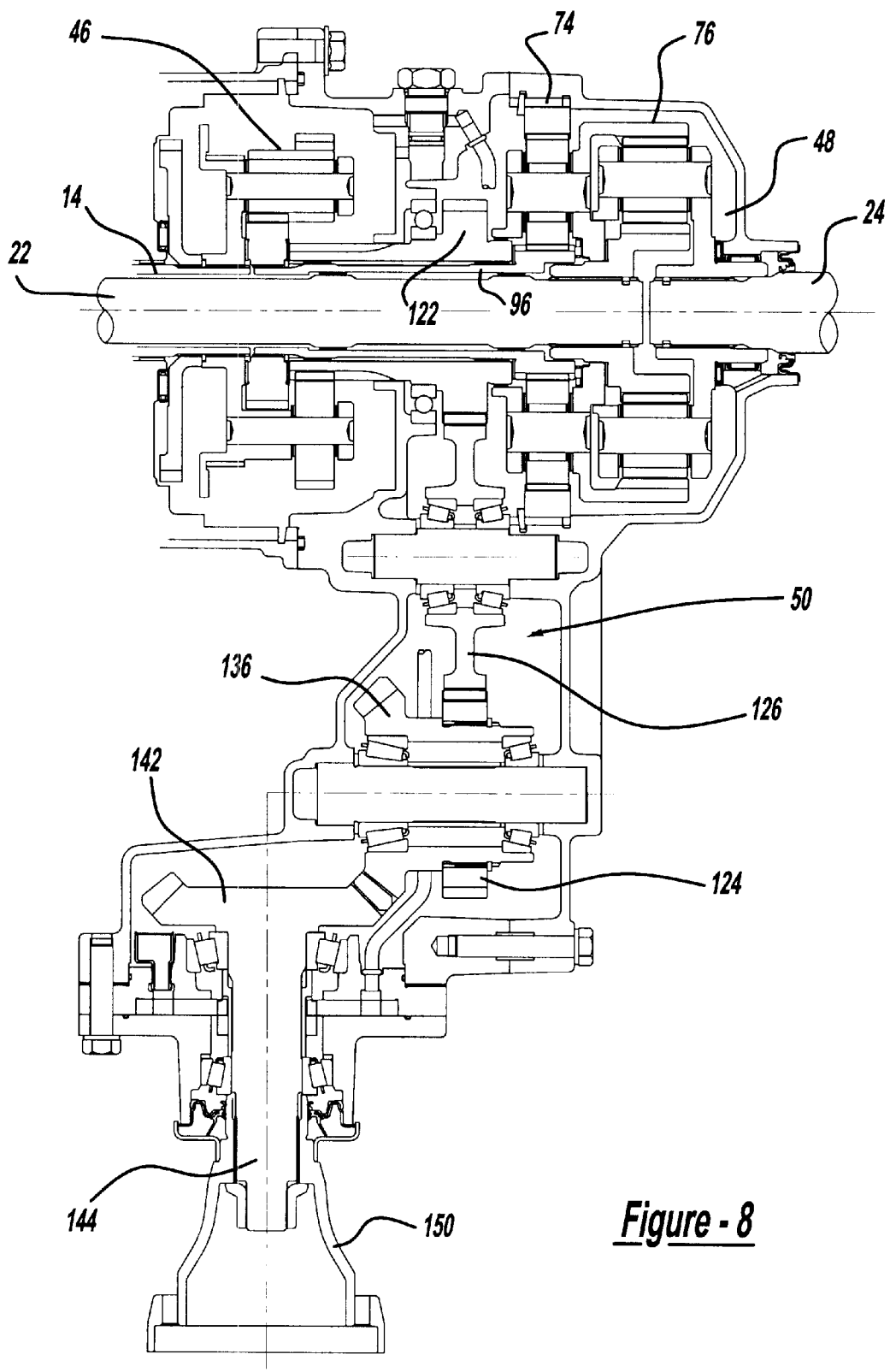
FIG. 8 is a sectional of an alternative construction for the power take-off unit of the present invention.

Finally, FIG. 8 illustrates PTU 16 with clutch assembly 52 removed such that interaxle differential 46 acts as an open center differential.

A preferred embodiment of the invention has been disclosed to provide those skilled in the art an understanding of the best mode currently contemplated for the operation and construction of the four-wheel drive hybrid drive system. The invention being thus described, it will be obvious that various modifications can be made without departing from the true spirit and scope of the invention, and all such modifications as would be considered by those skilled in the art are intended to be included within the scope of the following claims.

What is claimed is:

1. A power take-off unit for a full-time four-wheel drive vehicle having a powertrain and front and rear drivelines, comprising:

an input shaft adapted to be driven by the powertrain;

and interaxle differential having a first sun gear driving a rear drive assembly, a second sun gear driving a front drive assembly, a first carrier driven by said input shaft, a set of first planet gears rotatably supported by said first carrier and meshed with said first sun gear, and a set of second planet gears rotatably supported by said first carrier and meshed with said second sun gear and said first planet gears;

said front drive assembly including a final drive unit and a differential unit, said final drive unit having a third sun gear driven by said first sun gear, a first ring gear fixed to a stationary member, and a set of first pinion gears meshed with said first ring gear and said third sun gear and which are rotatably supported from a second carrier, said differential unit having a second ring gear driven by said second carrier, a fourth sun gear fixed to one of a pair of front axleshafts associated with the front driveline, a third carrier fixed to the other of said pair of front axleshafts, a set of second pinion gears rotatably supported from said third carrier and meshed with said second ring gear, and a set of third pinion gears rotatably supported from said third carrier and meshed with said fourth sun gear and said second pinion gears; and said rear drive assembly includes a first transfer gear driven by said second sun gear, a second transfer gear driving a first bevel gear, a third transfer gear meshed with said first and second transfer gears, a second bevel gear meshed with said first bevel gear, and an output shaft fixed to said second bevel gear and which is adapted for connection to the rear driveline.

2. The power take-off unit of claim 1 further comprising a first transfer shaft interconnecting said first sun gear to said third sun gear, and a second transfer shaft interconnecting said second sun gear to said first transfer gear.

3. The power take-off unit of claim 1 wherein said first, second and third transfer gears define a three gear helical gearset.

4. The power take-off unit of claim 1 wherein said first transfer gear is rotatable about a first axis, said second transfer gear is rotatable about a second axis, and said third transfer gear is rotatable about a third axis, and wherein each axis is offset relative to the other two axes.

5. The power take-off unit of claim 1 wherein said first bevel gear includes a stub shaft segment to which said second transfer shaft is secured.

6. The power take-off unit of claim 1 further comprising a torque biasing clutch assembly operable for limiting relative rotation across said interaxle differential.

7. The power take-off unit of claim 6 wherein said clutch assembly includes a clutch pack operably disposed between said first carrier and one of said first and second sun gears, and an actuator for exerting a clutch engagement force on said clutch pack.

8. The power take-off unit of claim 7 wherein said actuator includes a piston supported for movement in a piston chamber, a control valve operable to control fluid flow into and out of said piston chamber, and a pump for supplying high pressure fluid to said control valve, said power take-off unit further comprising a traction control system having an electric controller operable to receive input signals from vehicle sensors, said controller operable to send electric control signals to said control valve in response said input signals.

9. The power take-off unit of claim 8 wherein said pump is a variable displacement pump that generates a fluid pumping action in response to rotation of said output shaft, and wherein said control valve is an electro-hydraulic valve.

10. A motor vehicle comprising:

a powertrain including an engine and a transmission;

a pair of front wheel interconnected to a pair of front axleshafts;

a rear axle assembly having a final drive unit connected to a pair of rear wheels;

a rear propshaft driving said final drive unit of said rear axle assembly; and a power take-off unit having an input shaft driven by said transmission, and interaxle differential having a first sun gear driving a rear drive assembly, a second sun gear driving a front drive assembly, a first carrier driven by said input shaft, a set of first planet gears rotatably supported by said first carrier and meshed with said first sun gear, and a set of second planet gears rotatably supported by said first carrier meshed with said second sun gear and said first planet gears, said front drive assembly including a final drive unit and a differential unit, said final drive unit having a third sun gear driven by said first sun gear, a first ring gear fixed to a stationary member, and a set of first pinion gears meshed with said first ring gear and said third sun gear and which are rotatably supported from a second carrier, said differential unit includes a second ring gear driven by said second carrier, a fourth sun gear fixed to one of said pair of front axleshafts, a third carrier fixed to the other of said pair of front axleshafts, a set of second pinion gears rotatably supported from said third carrier and meshed with said second ring gear, and a set of third pinion gears rotatably supported from said third carrier and meshed with said fourth sun gear and said second pinion gears, said rear drive assembly includes a first transfer gear driven by said second sun gear, a second transfer gear driving a first bevel gear, a third transfer gear meshed with said first and second transfer gears, a second bevel gear meshed with said first bevel gear, and an output shaft fixed to said second bevel gear and which is adapted for connection to said rear propshaft.

11. The motor vehicle of claim 10 further comprising a first transfer shaft interconnecting said first sun gear to said third sun gear, and a second transfer shaft interconnecting said second sun gear to said first transfer gear.

12. The motor vehicle of claim 10 wherein said first, second and third transfer gears define a three gear helical gearset.

13. The motor vehicle of claim 10 wherein said first transfer gear is rotatable about a first axis, said second transfer gear is rotatable about a second axis, and said third transfer gear is rotatable about a third axis, and wherein each axis is offset relative to the other two axes.

14. The motor vehicle of claim 10 wherein said first bevel gear includes a stub shaft segment to which said second transfer shaft is secured.

15. The motor vehicle of claim 10 further comprising a torque biasing clutch assembly operable for limiting relative rotation across said interaxle differential.

16. The motor vehicle of claim 15 wherein said clutch assembly includes a clutch pack operably disposed between said first carrier and one of said first and second sun gears, and an actuator for exerting a clutch engagement force on said clutch pack.

17. The motor vehicle of claim 16 wherein said actuator includes a piston supported for movement in a piston chamber, a control valve operable to control fluid flow into and out of said piston chamber, and a pump for supplying high pressure fluid to said control valve, and further including a traction control system having an electric controller operable to receive input signals from vehicle sensors and send electric control signals to said control valve in response thereto.

18. The motor vehicle of claim 17 wherein said pump is a variable displacement pump that generates a fluid pumping action in response to rotation of said output shaft, and wherein said control valve is an electro-hydraulic valve.

19. A power transfer unit for a four-wheel drive vehicle having a powertrain and sets of first and second wheels, comprising:

an input shaft adapted to be driven by the powertrain;

a first planetary gearset having an input driven by said input shaft, and first and second outputs, wherein said input of said first planetary gearset is a first carrier, said first output is a first sun gear, and said second output is a second sun gear;

a second planetary gearset having an input driven by said first output of said first planetary gearset and an output driven at a reduced speed;

a third planetary gearset having an input driven by said output of said second planetary gearset, a first output driving a first axleshaft and a second output driving a second axleshaft, said first and second axleshafts driving the set of first wheels;

a transfer assembly having a first transfer gear driven by said second output of said first planetary gearset, a second transfer gear, and a transfer unit for transmitting rotary power for said first transfer gear to said second transfer gear; and a bevel gearset including a first bevel gear driven by said second transfer gear meshed with a second bevel gear that is operably connected to the pair of second wheels.

20. The power transfer unit of claim 19 wherein said first planetary gearset further includes a first planet gear supported by said first carrier and meshed with said first sun gear, and a second planet gear supported by said first carrier and meshed with both said second sun gear and said first planet gear.

21. The power transfer unit of claim 19 wherein said second sun gear drives a transfer shaft which drive said first transfer gear, and wherein said transfer unit is a third transfer gear meshed with both said first and second transfer gears.

* * * * *